United States Patent
Smith-Velazquez et al.

(10) Patent No.: US 11,816,996 B1
(45) Date of Patent: Nov. 14, 2023

(54) PILOT DECISION SPACE FOR SONIC BOOM IMPACT RESOLUTION

(71) Applicant: Rockwell Collins, Inc., Cedar Rapids, IA (US)

(72) Inventors: Laura M. Smith-Velazquez, Owings Mills, MD (US); Erik Theunissen, Leiderdorp (NL)

(73) Assignee: Rockwell Collins, Inc., Cedar Rapids, IA (US)

( * ) Notice: Subject to any disclaimer, the term of this patent is extended or adjusted under 35 U.S.C. 154(b) by 384 days.

(21) Appl. No.: 16/714,299

(22) Filed: Dec. 13, 2019

(51) Int. Cl.
| | |
|---|---|
| *G08G 5/00* | (2006.01) |
| *G01C 23/00* | (2006.01) |
| *G01H 17/00* | (2006.01) |
| *B64C 30/00* | (2006.01) |

(52) U.S. Cl.
CPC ......... *G08G 5/0021* (2013.01); *G01C 23/005* (2013.01); *G01H 17/00* (2013.01); *G08G 5/006* (2013.01); *G08G 5/0039* (2013.01)

(58) Field of Classification Search
CPC .... G08G 5/0021; G08G 5/0039; G08G 5/006; B64C 23/04; B64C 30/00; G01C 23/005; G01H 17/00
USPC ....... 224/1 N; 702/39; 701/3, 454, 458, 460; 244/1 N
See application file for complete search history.

(56) References Cited

U.S. PATENT DOCUMENTS

| | | | |
|---|---|---|---|
| 6,905,091 B2 | 6/2005 | Berson et al. | |
| 7,599,805 B2 | 10/2009 | Pilon | |
| 8,145,366 B1* | 3/2012 | Haering, Jr. | G01C 23/00 244/1 N |
| 10,146,903 B2 | 12/2018 | Shen | |
| 10,209,122 B1 | 2/2019 | Suddreth et al. | |
| 2005/0010359 A1* | 1/2005 | Qureshi | G01C 23/005 701/4 |
| 2005/0098681 A1* | 5/2005 | Berson | G08G 5/0052 244/1 N |
| 2006/0111818 A1* | 5/2006 | Ishii | G01C 23/00 701/3 |
| 2011/0046818 A1* | 2/2011 | Herkes | G08G 5/0017 701/3 |
| 2012/0296499 A1* | 11/2012 | Kirchhofer | G05D 1/102 701/3 |
| 2017/0076610 A1* | 3/2017 | Liu | G08G 5/0069 |
| 2018/0061245 A1* | 3/2018 | Adler | G08G 5/0026 |
| 2018/0354636 A1* | 12/2018 | Darnell | G08G 5/0034 |
| 2019/0088145 A1* | 3/2019 | Chambers | G08G 5/0034 |
| 2019/0164436 A1 | 5/2019 | Suddreth et al. | |
| 2019/0272762 A1 | 9/2019 | Suddreth et al. | |

FOREIGN PATENT DOCUMENTS

| | | |
|---|---|---|
| CN | 108170878 A | 6/2018 |
| EP | 3506240 A1 | 7/2019 |

* cited by examiner

*Primary Examiner* — Jonathan M Dager
*Assistant Examiner* — Aaron K McCullers
(74) *Attorney, Agent, or Firm* — Suiter Swantz pc llo (57) ABSTRACT

A system for predicting pressure waves in a sonic boom footprint calculates alternative footprints and pressure waves along a flight path based on speed and altitude modifiers. The available, adjustable parameters are bounded within a flight envelope and along an approved flight corridor. The system receives and incorporates data from external sources, such as weather data, that impacts sonic boom pressure wave predictions and aircraft performance characteristics.

9 Claims, 10 Drawing Sheets

PILOT DECISION SPACE FOR SONIC BOOM IMPACT RESOLUTION

GOVERNMENT LICENSE RIGHTS

The U.S. Government has a paid-up license in this invention and the right in limited circumstances to require the patent owner to license others on reasonable terms as provided by the terms of NND15AA50C awarded by the National Aeronautics and Space Administration.

BACKGROUND

Flying supersonic capable aircraft poses unique challenges to the pilot. Noise abatement restrictions, now and in the future, may limit the pressure differences or sound levels due to sonic boom. Pilots will have to determine if operations can be conducted within those limitations along a flight corridor. A terrain database may provide pilots access to information pertaining to such noise abatement regions; however, pilots still need to evaluate sonic boom impacts in relation to future noise abatement areas and resolve violations to the noise abatement limits. The degrees of freedom of variables to modify the flight plan and the context under which these variables can be modified to resolve impacts are extensive, The required trial and error/guesswork to determine what parameters or combination of parameters should be modified is inefficient to resolve the violations,

SUMMARY

In one aspect, embodiments of the inventive concepts disclosed herein are directed to a system for predicting pressure waves in a sonic boom footprint and calculating alternative footprints and pressure waves along a flight path based on speed and altitude modifiers. The available, adjustable parameters are bounded within a flight envelope and along an approved flight corridor.

In a further aspect, the system receives and incorporates data from external sources, such as weather data, that impacts sonic boom pressure wave predictions and aircraft performance characteristics.

A decision space is provided by displaying information of where the flight plan is violating a limit and mapping out resolution options in terms of airspeed, altitude, and lateral guidance (but is not limited to these variables). In addition flight plan modification features and information are added to the Navigation Display (ND) and the Vertical Situation Display (VSD) that give the pilot greater latitude to use graphical flight planning in-flight to preview impacts and make and execute informed changes in the flight plan.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for predicting pressure waves in a sonic boom footprint and calculating alternative footprints and pressure waves along a flight path based on speed and altitude modifiers. Alternative footprints and pressure waves may also be determined with respect to acceleration limits defined by bank angle and rate angle changes for climb and descent. The available, adjustable parameters are bounded within a flight envelope and along an approved flight corridor.

Figure 1:
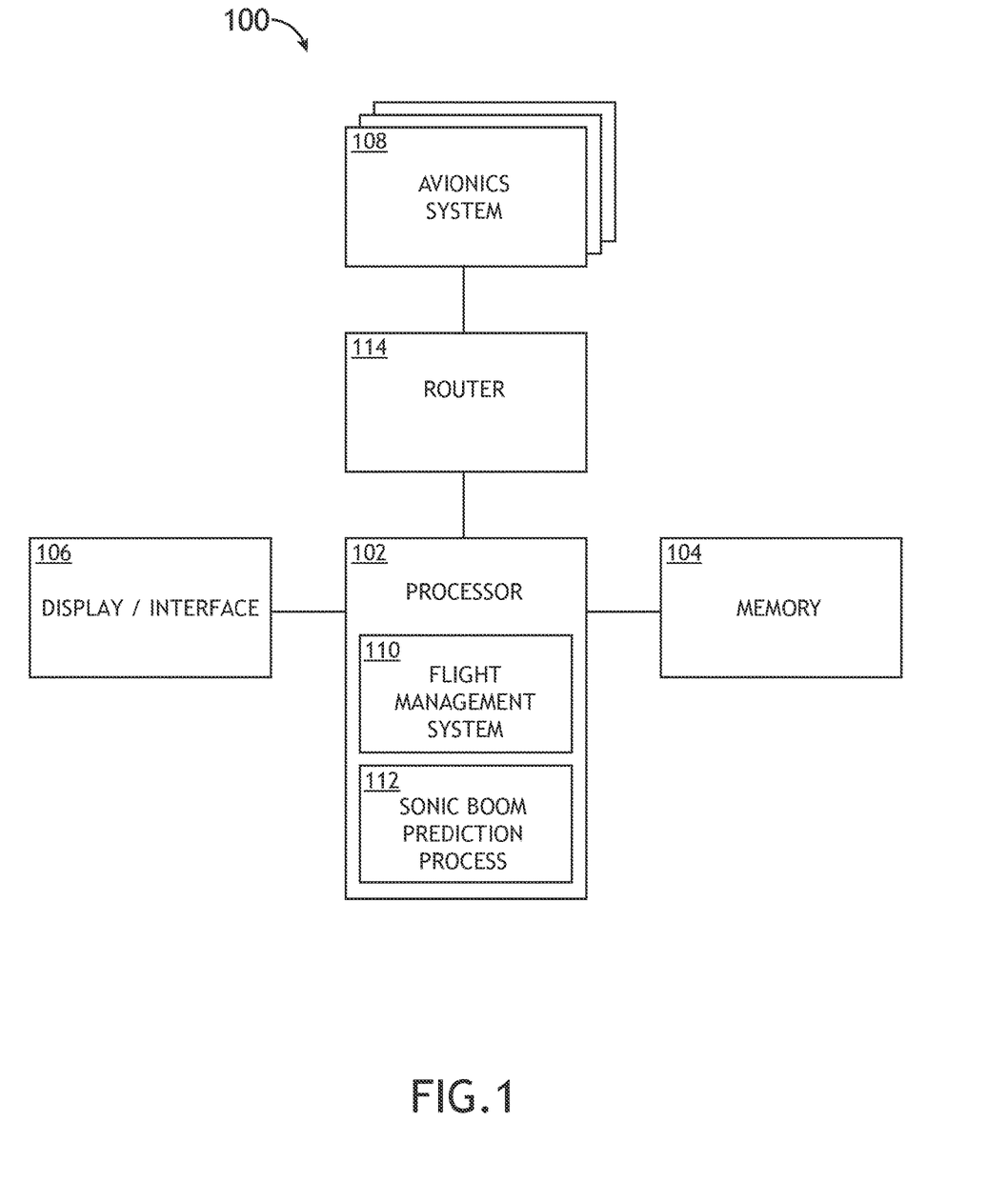
FIG. 1 shows a block diagram of a system for implementing an exemplary embodiment of the inventive concepts disclosed herein.

Referring to FIG. 1, a block diagram of a system 100 for implementing an exemplary embodiment of the inventive concepts disclosed herein is shown. An aircraft designed for supersonic operation includes a processor 102, a memory 104 connected to the processor 102 for embodying processor executable code, and a display/interface device 106 connected to the processor 102. When establishing a flight path, a flight management system 110 (which may be embodied as a process on the processor 102 or a separate system on-board the aircraft) determines the flight path based on mission criteria, and the processor 102 renders a graphical representation of the flight path with respect to the surrounding terrain. A sonic boom prediction process 112 determines a predicted sonic boom footprint with respect to certain predictive algorithms based on aircraft speed, flight path, and terrain, potentially with color specific delineations corresponding to pressure differences at ground level; in at least one embodiment, pressure differences may be converted to a decibel level. Furthermore, the surrounding terrain may include features with regulatorily defined limitations governing their exposure to a sonic boom footprint or the corresponding pressure differences or decibel levels. Such limitations may be represented via a map overlay to the graphical representation of the flight path and surrounding terrain.

The processor 102 renders a side view representation of the aircraft along the flight path, including a vertical component of the flight path corresponding to altitude. The side view representation may include boundaries corresponding to the regulatory limitations.

In at least one embodiment, the processor 102 identifies areas along the flight path where the sonic boom footprint is predicated to violate the regulatory limitations. Those areas may be rendered in a specific style, color, etc. The processor 102 may also calculate one or more optional modifications to resolve the predicted violations. Those optional modifications may be rendered in the side view and, optionally, in the graphical representation of the flight path.

In at least one embodiment, the processor 102 may determine the one or more optional modifications by determining if an altitude change resolves the predicted violation. For example, the sonic boom prediction process 112 may recalculate the sonic boom footprint based on the aircraft's maximum operational altitude; if the violation is resolved at that altitude, the processor 102 (via the conic boom prediction process 112) may iteratively recalculate the sonic boom footprint to identify a minimum altitude change to resolve the violation. Alternatively, or in addition, the processor 102 may recalculate the sonic boom footprint based on an altitude change corresponding to a proportional difference between the predicted pressure wave and regulatory limitation.

In at least one embodiment, the processor 102 may determine if a lateral movement will resolve the predicted violation by recalculating the sonic boom footprint. In at least one embodiment, the processor 102 may receive a defined flight corridor from an air traffic controller and make such lateral movement calculations based on the aircraft at the extreme edges of the flight corridor and comparing to the regulatory limitations for the ground features.

In at least one embodiment, the processor 102 may determine if a speed change (other than transitioning to sub-sonic flight) will resolve the predicted violation. Furthermore, the processor 102 may receive data from connected avionics systems 108 to incorporate into the recalculation steps. For example, the processor 102 may receive weather data that may alter the predicted sonic boom footprint. In at least one embodiment, the processor 102 may further identify interstitial combinations of altitude, flight path, and speed modifications to resolve the violation.

The processor 102 may render one or more potential modifications as options on the display interface device 106. The pilot may then select one of the rendered options which is transferred to the corresponding avionics system 108, or to a ground-based system via a datalink connection and a secure router 114. Alternatively, the pilot may manually alter one or more of the variables (altitude, flight path, or speed). The processor 102 may then recalculate a new set of optional modifications with the manually altered variables being fixed. Furthermore, the pilot may add various waypoints to the flight path with modifications associated with one of the waypoints such that particular sets of altitude, flight path, and speed may be fixed at future points in time; additional future recalculations may be based on those fixed points.

Figure 2:
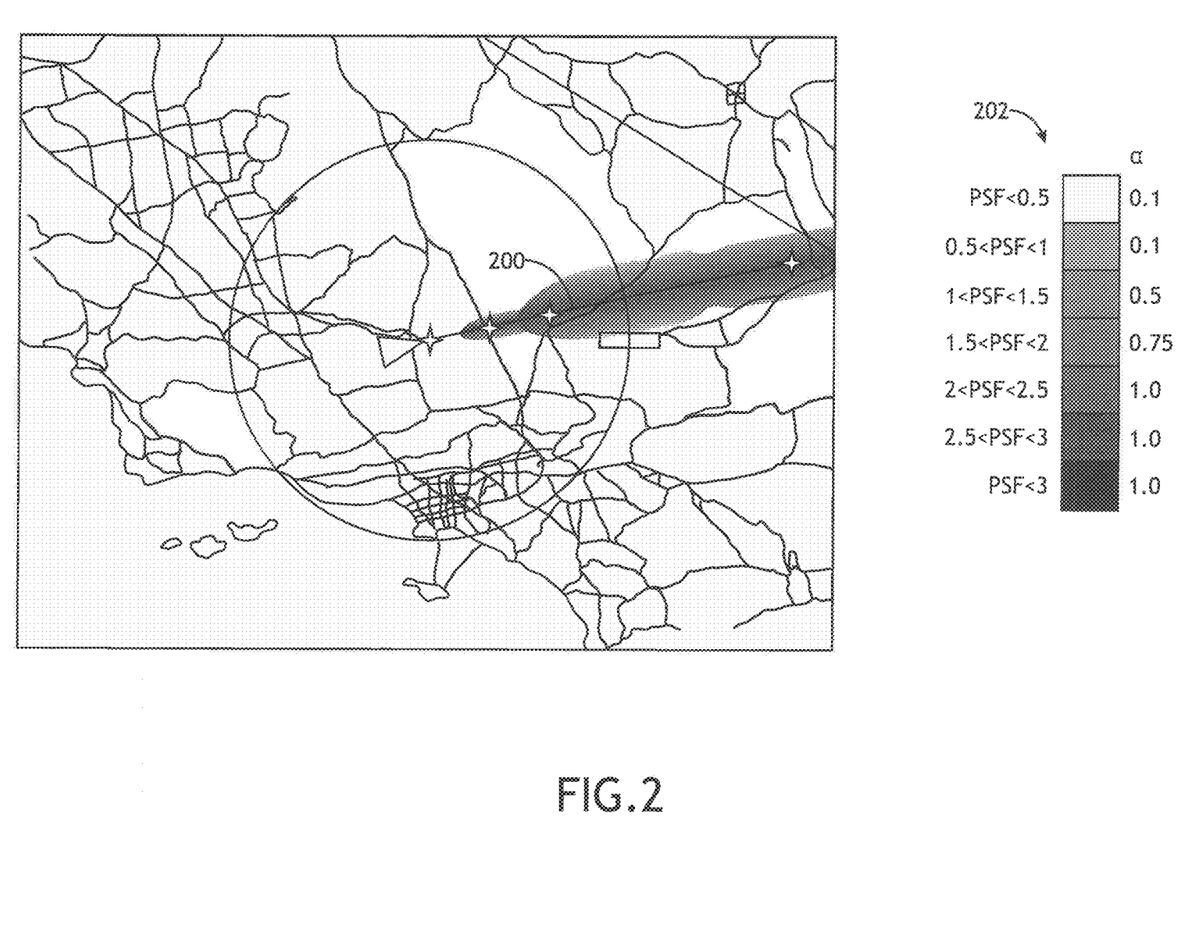
FIG. 2 shows a representation of a sonic boom carpet or footprint.

Referring to FIG. 2, a representation of a sonic boom carpet or footprint 200 is shown. The real-time predicted sonic boom footprint 200 may be incorporated into a primary flight display and/or a multi-function display. Color coding is used to convey information about the absolute severity of pressure created by the sonic boom. The pressure values may be translated to color according to a lookup table 202. The value a represents translucency on a scale from 0 (fully translucent) to 1 (solid). It may be appreciated that while the drawings referenced herein are black and or grayscale, in practice, the display would be rendered in color with color coded delineations based on predefined pressure thresholds.

The acceptability of a sonic boom depends on its location with respect to a world-view terrain database. Tactical charts and digital feature analysis data, visualizing the contours of built-up areas, may be selected to provide a reference. Outside these built-up areas, higher levels of pressure or noise may be acceptable.

Figure 3:
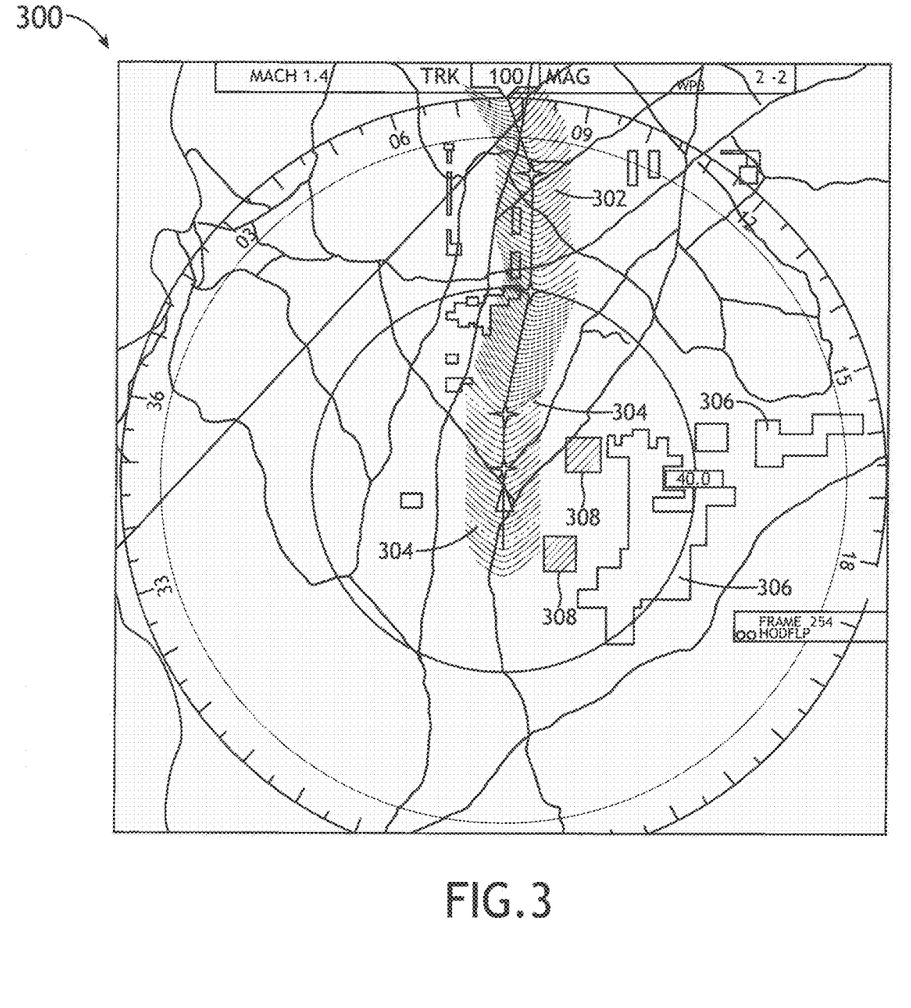
FIG. 3 shows a representation of a sonic boom impact along a flight path.

Referring to FIG. 3, a representation of a sonic boom impact 300 along a flight path is shown. The sonic boom footprint may be divided time specific pressure thresholds 302, 304. The time specific pressure thresholds 302, 304 may be rendered with color specific gradients radiating from a center line (the flight path) outward indicating when the pressure wave drops below a defined limit. The gradients may also be shaped to indicate travel of each specific pressure thresholds 302, 304 over time.

For built-up areas 306, 308, the acceptability of a certain maximum pressure will vary as a function of location. A dedicated map layer provides maximum pressure information such as by flagging noise abatement areas 308 where pressure differences or decibel levels are required to be below a threshold.

When generating the sonic boom footprint, excessive pressure thresholds 304 may be identified where the boom-profile of a planned route violates a regulatory constraint of the restricted area 308. By georeferencing pressure threshold levels for noise abatement areas 308, an on-board computer computes a predicted sonic boom impact, and compares the georeferenced pressure thresholds and predicted sonic boom impact to generate an automatic impact assessment and alert the pilot to the portion of the assessment that fads limits. Furthermore. the "allowable" limits are coded on the aircrafts predicted sonic boom footprint.

Figure 4:
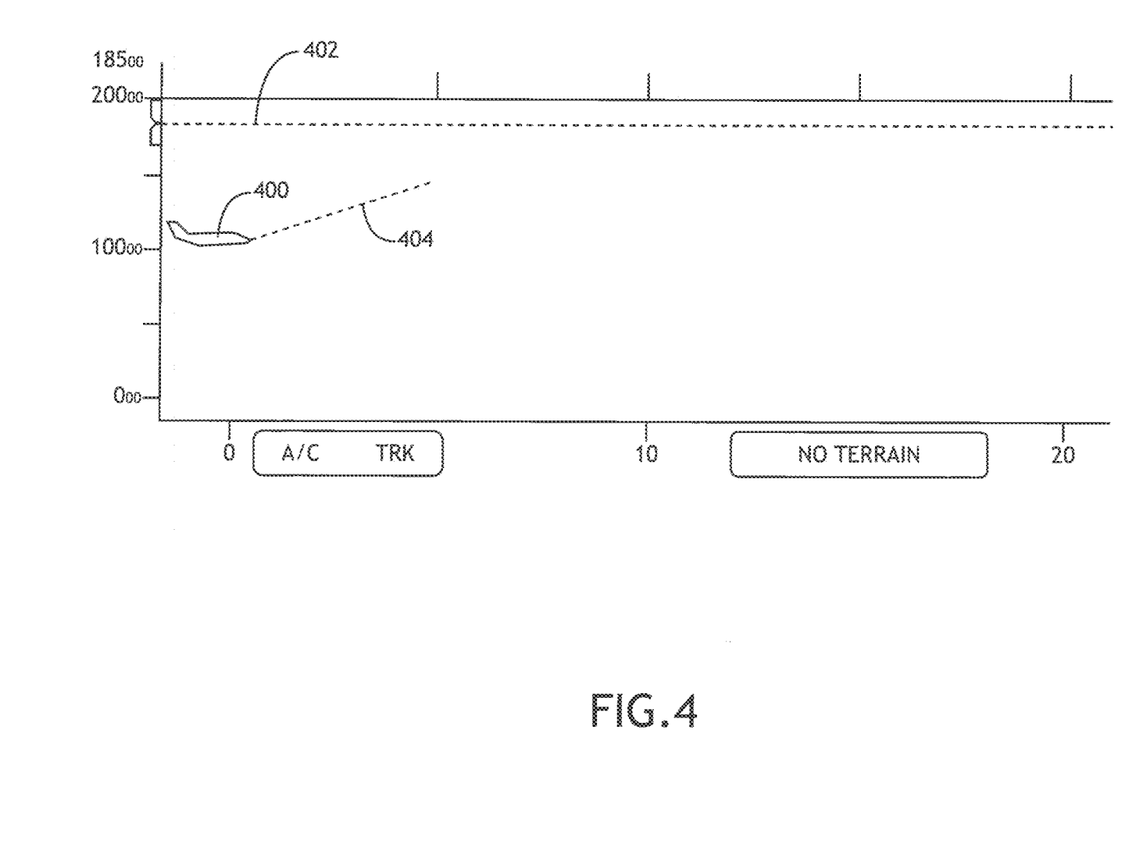
FIG. 4 shows a vertical situational display.

Referring to FIG. 4, a vertical situational display is shown. A representation of the aircraft 400, flight ceiling 402, and a sideview display an altitude profile 404 of the planned route is used to avow an on-board system to make predictive changes to the altitude and speed of the aircraft 400.

Figure 5:
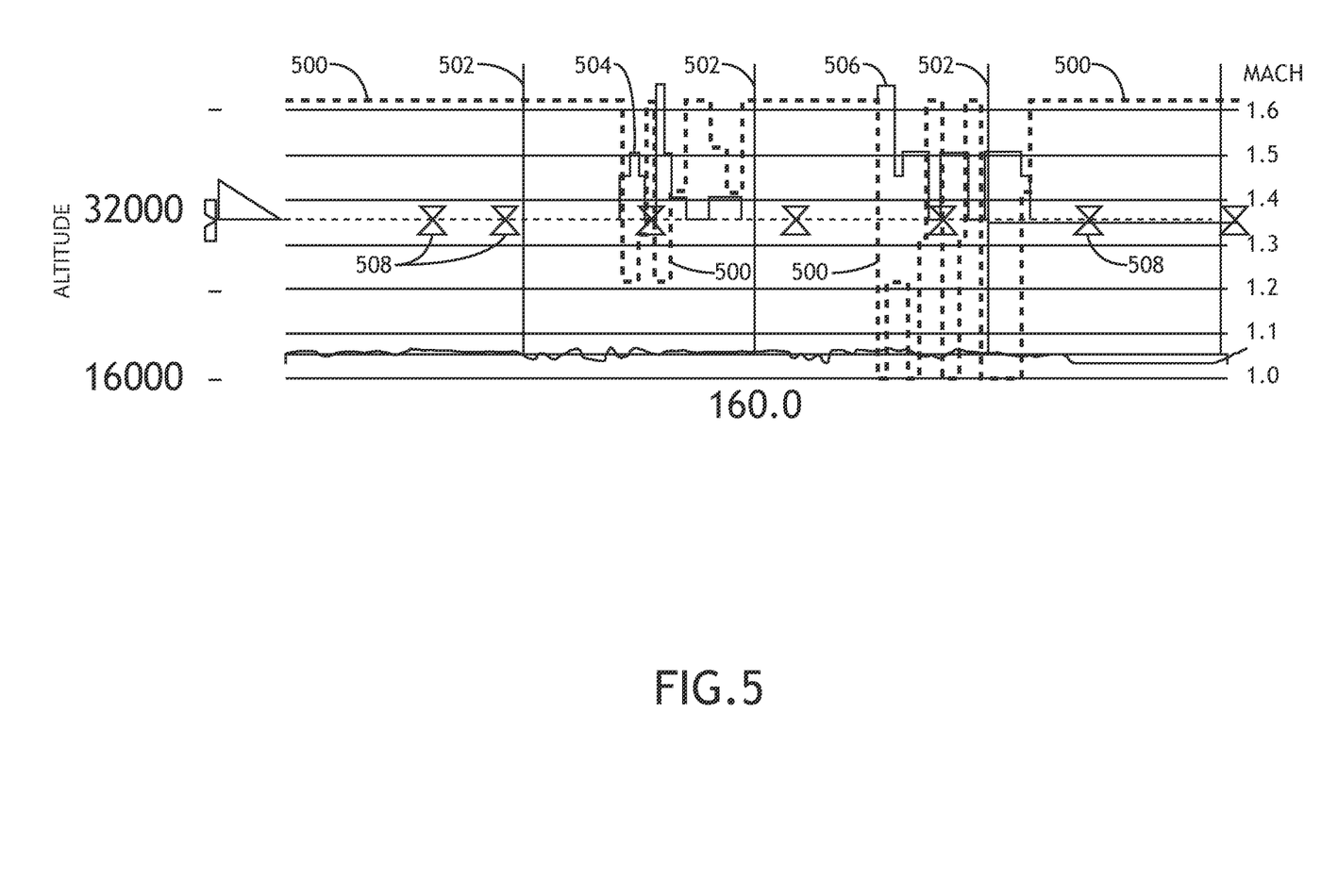
FIG. 5 shows a vertical situational display according to an exemplary embodiment of the inventive concepts disclosed herein.

Referring to FIG. 5, a vertical situational display according to an exemplary embodiment of the inventive concepts disclosed herein is shown. The display illustrates an altitude and speed decision space limit 500 showing the acceptable flight envelope of the aircraft. The display may be divided into intervals such as via vertical lines 502 at five-minute intervals.

In at least one embodiment, for those locations at which the impact is not acceptable, a required minimum increase in altitude is depicted. Alternatively, or in addition, a required minimum decrease in Mach is depicted. The altitude and Mach displays may be combined in a single viewport. Other implementations may consist of two separate displays, one for the altitude profile and required changes and one for the Mach profile and required changes.

To enable the pilot to modify the planned altitude profile, waypoints 508 can be moved up to increase altitude and down to decrease altitude. In at least one embodiment, waypoints 508 may be dragged and dropped onto the flight path. In at least one embodiment, the pilot may modify the planned Mach profile by adjusting the vertical position of one or more of the waypoints in the sideview display. In at least one embodiment, the sonic boom footprint may be computed in real-time, and the effect of the modification is immediately visualized, both in the vertical situational display, and potentially in an overhead display, allowing direct manipulation. Alternatively, the pilot may use the depiction of the minimum required altitude and Mach changes as a target during the drag and drop of waypoints 508 in the altitude and Mach profile. The pilot may initiate a separate action recompute the sonic boom footprint along the modified profile.

In at least one embodiment, color coding is used to differentiate between situations where an acceptable sonic boom footprint can be achieved with an altitude and/or Mach change 504 and situations that cannot be resolved (no acceptable altitude and or Mach profile 506 exists). For example, an acceptable altitude and/or Mach change 504 may be colored green while unresolvable profiles 506 are colored red. A predicted Mach cutoff profile may be presented as a function of distance from the planned path. The Mach cutoff profile is integrated into the same view that also shows the Mach profile as a function of distance. A predicted "no-boom" altitude profile may be presented as a function of distance along the planned path.

Figure 6:
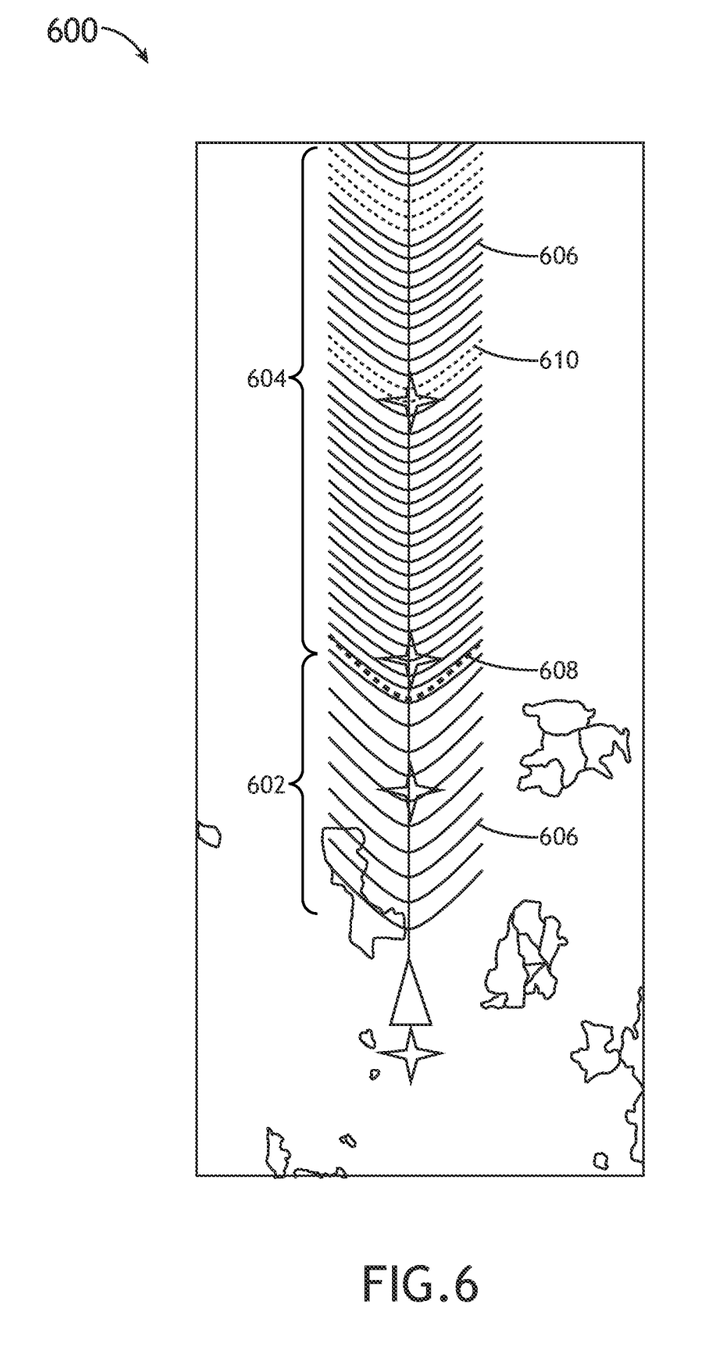
FIG. 6 shows a representation of a real-time and predictive sonic boom footprint on a navigational display according to an exemplary embodiment of the inventive concepts disclosed herein.

Referring to FIG. 6, a representation of a real-time and predictive sonic boom footprint 600 on a navigational display according to an exemplary embodiment of the inventive concepts disclosed herein is shown.

In at least one embodiment, an aircraft system combines a depiction of a real-time computed footprint 602 up to a specified look-ahead time with the pre-computed footprint 604 beyond this look-ahead time. Both the real-time computed footprint 602 and pre-computed footprint 604 may be divided into intervals 606, 608, 610 according to the processing capability of the system to produce real-time data in time to allow the pilot to make decisions. The intervals 606, 608, 610 give the pilot a visual indication of the flight time associated with components of the sonic boom footprint 600. To seamlessly integrate the depiction of the (plan-based) pre-computed footprint 604 with the real-time computed footprint 602, the set of trajectory points that is input to the real-time sonic boom computation function takes into account planned changes in direction. This is achieved by switching from a first order prediction to a second order prediction for any predicted trajectory points that lie beyond the planned turn initiation point. The second order prediction is used until the second order prediction has a heading that matches the direction of the planned path after the planned turn within prespecified margins.

Based on a current flight path, speed, and noise abatement map overlay, the system may render any intervals 608 associated with a profile that requires an altitude or Mach modifications to resolve a violation. Furthermore, the system may render any intervals 610 associated with a profile having an unresolvable violation.

Figure 7:
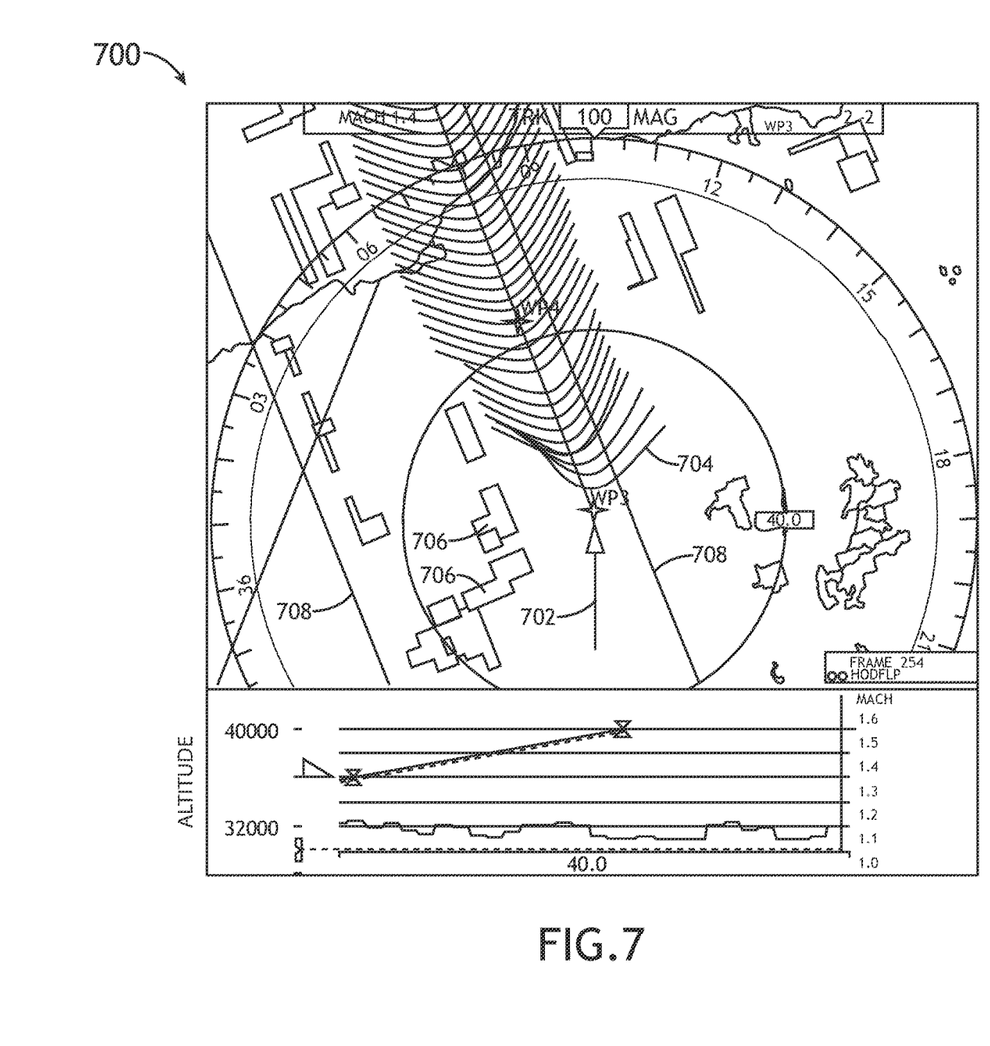
FIG. 7 shows a representation of a heading and sonic boom prediction along a planned path according to an exemplary embodiment of the inventive concepts disclosed herein.

Referring to FIG. 7, a representation of a heading and sonic boom prediction 700 along a planned path according to an exemplary embodiment of the inventive concepts disclosed herein is shown. An on-board system renders a flight path 702 and intervals 704 corresponding to a real-time or predicted sonic boom footprint of the aircraft traveling along the flight path 702. Noise abatement regions 706 are rendered for a visual indication of the exitance and extent of any potential violations. The system also renders the boundaries 708 of a flight corridor corresponding to a clearance from air traffic control for a volume of airspace to maneuver in. The display of this corridor provides pilots with a visual indication of how far laterally they are able to modify the flight path to resolve any violations. In addition, a coastal offset may be depicted to avoid the sonic boom reaching the coast during overwater operations. Such lateral restrictions may be depicted via specific color coding.

In at least one embodiment, the system may be placed into a "trial" mode to define Mach and altitude at locations where pressure exceeds a regulatory threshold. The results of this trial mode provide Mach/altitude combinations that are displayed graphically and integrated with flight plan controls (rate of climb, speed, acceleration points, waypoints, etc.)

allowing pilots to see the effect of their changes as they are made. Limited sets of altitude and Mach modifications may be represented to reduce the trial-and-error guesswork often employed in making decisions on what parameters or combination of parameters is most efficient to resolve the impacts. Waypoints are queried with different options for varying aircraft parameters. The output provides the location and overpressure of boom waypoints that can be compared to threshold limits in a pass/fail manner, building an image in space of where altitude and Mach modifications fail to provide resolution. The result is a list of the smallest speed and/or altitude changes at the problem points that would resolve any violations. This helps to answer the 'what if' question.

In at least one embodiment, a real-time mode is combined with a precomputed predicted impact on the navigational display. The horizon of the precomputed footprint is denoted by the change of transparency along the ray trace. In addition, tick marks may be added to the rays displayed as part of the real-time display to provide a time reference. These tick marks are at defined intervals with the first ray being time zero.

The combined real-time mode and the precomputed Impact display may comprise a heading trial feature. The heading trial feature allows the pilot to move the heading to preselect a heading that will resolve an impact. As the pilot changes the heading the predicted impact is updated and displayed. When the prediction using the selected heading is engaged, the selected heading is driven by the heading of the legs of the planned trajectory.

Figure 8:
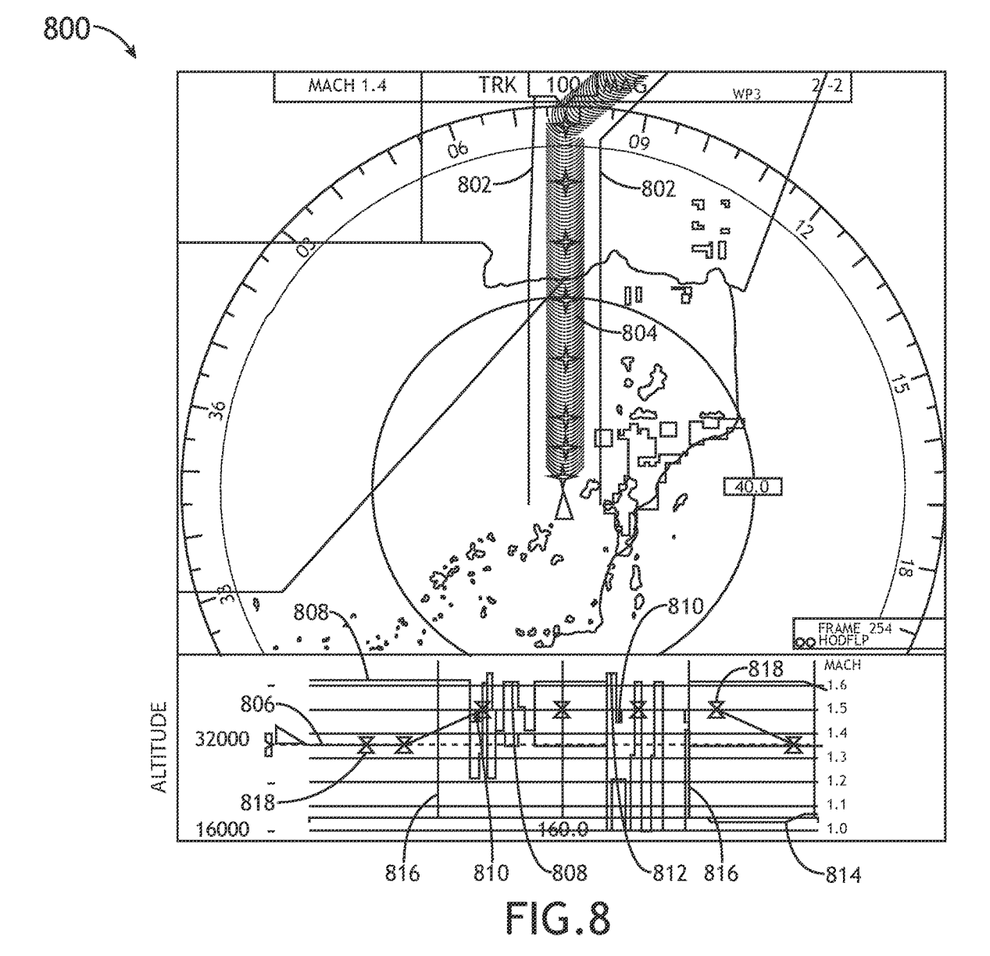
FIG. 8 shows a representation of a heading and sonic boom prediction along a planned path according to an exemplary embodiment of the inventive concepts disclosed herein.

Referring to FIG. 8, a navigational display 800 including flight corridor limits 802 and a representation of a heading and sonic boom prediction 804 along a planned path according to an exemplary embodiment of the inventive concepts disclosed herein is shown. The navigational display 800 also includes a vertical situational display of a planned flight altitude and speed 806. To provide a visual indication of altitude and Mach combinations, a limit line 808 is rendered from the output of a trial function. This line is then color coded to represent whether altitude changes would resolve a violation 810 or if a change in Mach is also required 812. A vertical scale and Mach readout is added to the vertical situational display. In addition, a "no-boom altitude" 814 may be rendered along with a line depicting a Mach cut-oft profile.

In at least one embodiment, interval markers 816 are included to help pilots determine how much time they have to resolve the violation. The vertical situational display combined with the navigational display provides a 4D decision space that quantifies the smallest change in horizontal, altitude, Mach, and altitude/Mach combination to resolve the violation. On the vertical situational display, waypoints 818 can be moved vertically to change altitude. In at least one embodiment, a modification to a waypoint may instruct the system to render a separate flight altitude and speed indicator in a different color to indicate changes are in an "edit mode" until the pilot instructs the system to implement the changes. Such convention may be used on the navigational display when waypoints 818 are added or modified. Based on conflicts shown in the vertical situational display, a decision made to fly to a higher altitude (moving the waypoints to match the altitude decision space limit of the green line) may resolve violations on the navigational display. As a pilot moves waypoints 818 to change altitude, the rate of climb may be displayed as well.

Figure 9:
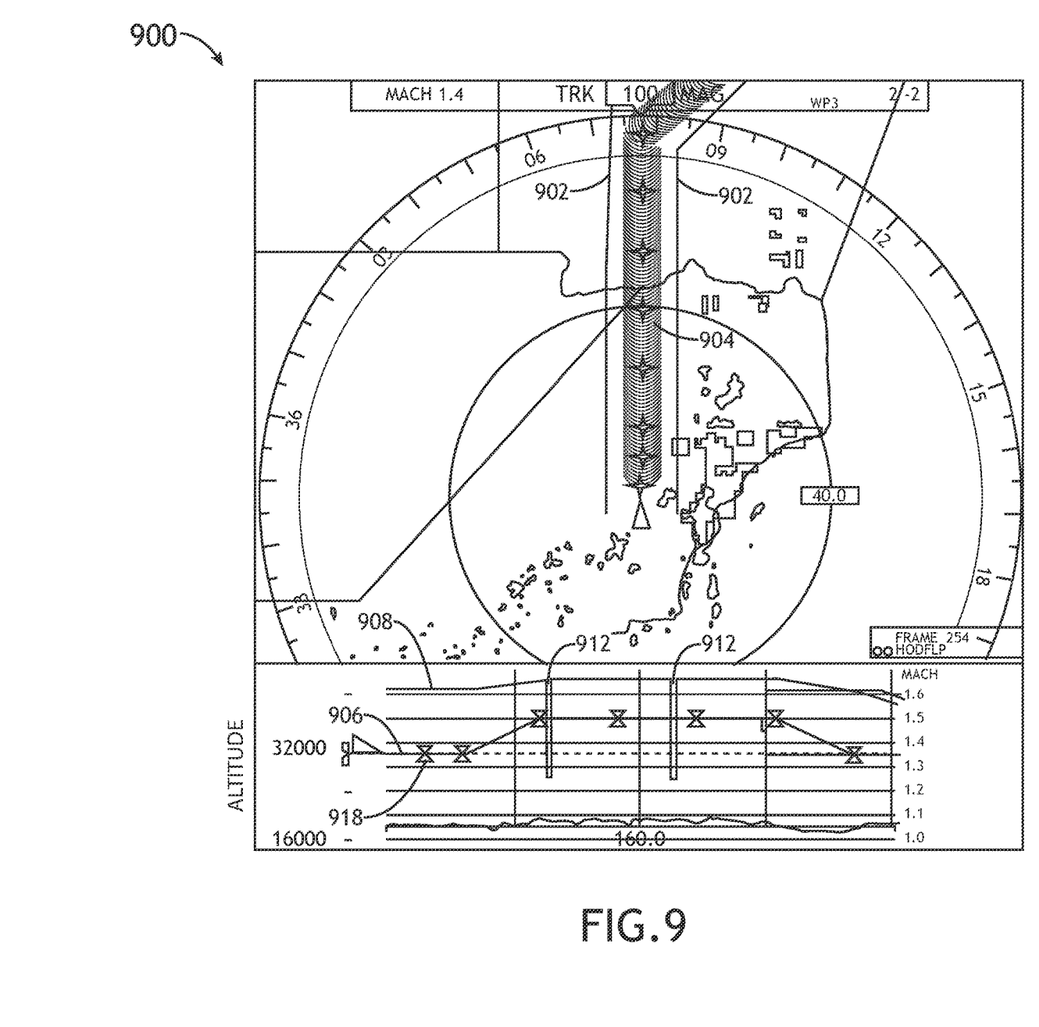
FIG. 9 shows a representation of a heading and sonic boom prediction along a planned path according to an exemplary embodiment of the inventive concepts disclosed herein.

Referring to FIG. 9, a navigational display 900 including flight corridor limits 902 and a representation of a heading and sonic boom prediction 904 along a planned path according to an exemplary embodiment of the inventive concepts disclosed herein is shown. The navigational display 900 also includes a vertical situational display of a planned flight altitude and speed 906.

After a pilot makes these changes to one or more waypoints 918 of the flight altitude and speed 906, the system will display impacts as a result of the change. For example, in FIG. 9, portions 912 of the limit line 908 show that at two locations, changing only the altitude will be insufficient. The system indicates two options to resolve the portions 912; reduce Mach below Mach 1.3 or change the horizontal trajectory. In practice, the portions 912 may be rendered in a distinct color such as a red line.

Figure 10:
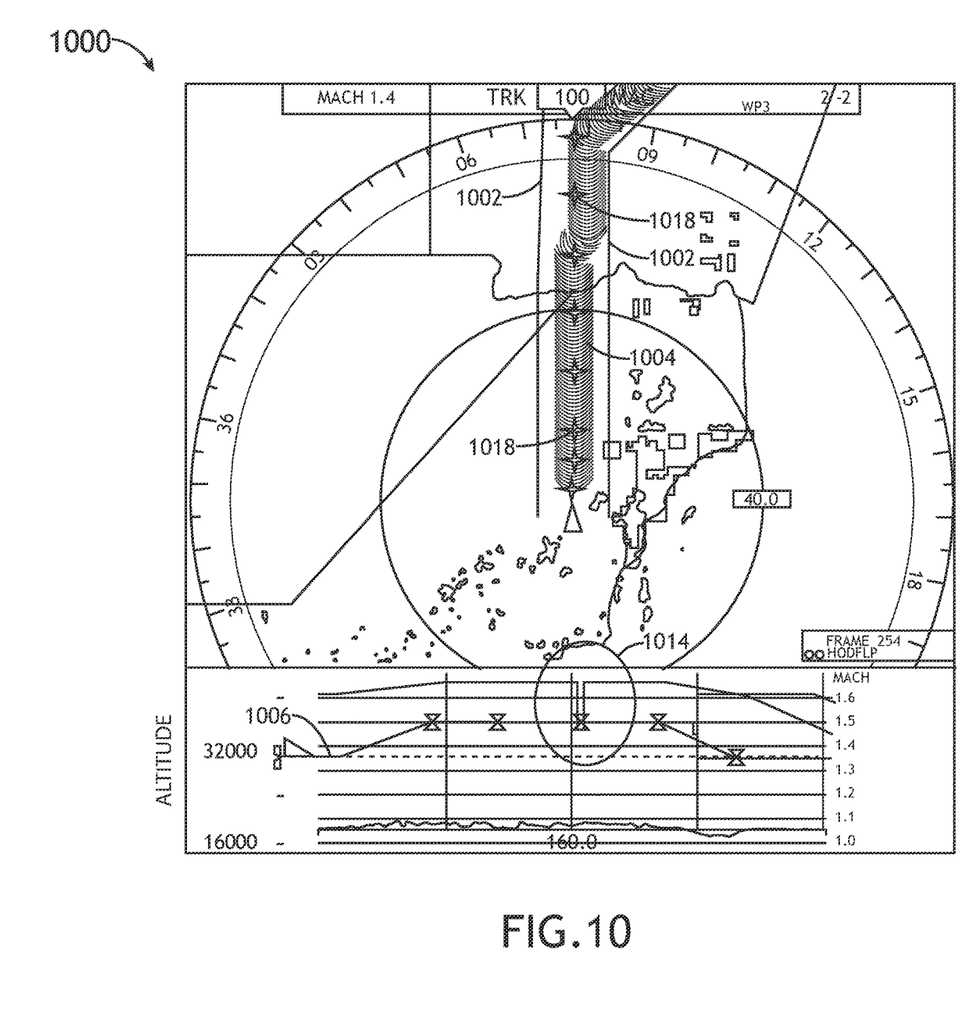
FIG. 10 shows a representation of a heading and sonic boom prediction along a planned path according to an exemplary embodiment of the inventive concepts disclosed herein.

Referring to FIG. 10, a navigational display 1000 including flight corridor limits 1002 and a representation of a heading and sonic boom prediction 1004 along a planned path according to an exemplary embodiment of the inventive concepts disclosed herein is shown. Where it is determined that a small lateral change will resolve any violations of the flight plan, certain waypoints 1018 may be moved laterally, but still within the corridor limits 1002. The new sonic boom prediction 1004 is computed and violation 1014 is still found near a waypoint. A small change in altitude will resolve the violation 1014.

Once a flight plan modification is complete and all violations are resolved, the pilot may execute the new flight plan trajectory and the flight plan depiction changes from "edit mode" (for example, a white line where rendered on a color display device) to "active mode" (for example, a magenta line where rendered on a color display device) to represent the new active flight plan.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:
1. An aircraft computer apparatus comprising:
a display device; and
at least one processor in data communication with a memory storing processor executable code for configuring the at least one processor to:
render a flight path on a navigational display;
render an altitude and speed indicator on a vertical situational display;
compute a real-time sonic boom footprint;
render the real-time sonic boom footprint to the navigational display;
compute a predicted sonic boom footprint;
render the predicted sonic boom footprint to the navigational display;
identify one or more regions along the flight path where a pressure difference or decibel level associated with at least one of the real-time sonic boom footprint or the predicted sonic boom footprint violate a predefined limit;

identify the one or more regions on the vertical situational display;

iteratively modify an altitude parameter and a speed associated with one of the one or more regions and recompute the predicted sonic boom footprint to determine a minimum altitude change to resolve the violation, beginning with an altitude change corresponding to a proportional difference between the predicted pressure difference and the predefined limit;

receive a flight corridor;

beginning from edges of the flight corridor, iteratively recompute the predicted sonic boom footprint to determine a minimum lateral movement to resolve the violation;

iteratively recompute the predicted sonic boom footprint based on the minimum altitude change and minimum lateral movement to identify one or more combinations of altitude change and lateral movement to resolve the violation;

render a plurality of computed interval markers in the real-time sonic boom footprint, spaced according to the speed;

render a plurality of predicted interval markers in the predicted sonic boom footprint, spaced according to the speed;

compile a set of related lateral movements, altitudes, and speeds that resolve the violation; and display the set of related lateral movements, altitudes, and speeds on the vertical situational display, wherein:

each computed interval marker is rendered to provide a visual indication if the computed interval marked corresponds to a resolvable violation or an unresolvable violation; and each predicted interval marker is rendered to provide a visual indication if the predicted interval marked corresponds to a resolvable violation or an unresolvable violation.

2. The aircraft computer apparatus of claim 1, wherein the at least one processor is further configured to:

receive an input corresponding to an adjustment to at least one of a prospective altitude or speed of the aircraft; and recompute the predicted sonic boom footprint.

3. The aircraft computer apparatus of claim 1, wherein the at least one processor is further configured to:

receive an input corresponding to one of the set of related altitudes and speeds; and send the related altitude and speed to an avionics system in data communication with the at least one processor.

4. The aircraft computer apparatus of claim 1, wherein the at least one processor is further configured to:

receive an input corresponding to a waypoint in the vertical situational display;

enter an edit mode; and recalculate the predicted sonic boom footprint after every modification to a waypoint in the vertical situational display.

5. The aircraft computer apparatus of claim 4, wherein the at least one processor is further configured to:

receive an input corresponding to an affirmation of all modifications;

send the modifications to an avionics system in data communication with the at least one processor; and exit the edit mode.

6. A method comprising:

rendering a flight path on a navigational display;

rendering an altitude and speed indicator on a vertical situational display;

computing a real-time sonic boom footprint;

rendering the real-time sonic boom footprint to the navigational display;

computing a predicted sonic boom footprint;

rendering the predicted sonic boom footprint to the navigational display;

identifying one or more regions along the flight path where a pressure difference or decibel level associated with at least one of the real-time sonic boom footprint or the predicted sonic boom footprint violate a predefined limit;

identifying the one or more regions on the vertical situational display;

iteratively modify an altitude parameter and a speed associated with one of the one or more regions and recompute the predicted sonic boom footprint to determine a minimum altitude change to resolve the violation, beginning with an altitude change corresponding to a proportional difference between the predicted pressure difference and the predefined limit;

receiving a flight corridor;

beginning from edges of the flight corridor, iteratively recomputing the predicted sonic boom footprint to determine a minimum lateral movement to resolve the violation;

iteratively recomputing the predicted the predicted sonic boom footprint based on the minimum altitude change and minimum lateral movement to identify one or more combinations of altitude change and lateral movement to resolve the violation;

rendering a plurality of computed interval markers in the real-time sonic boom footprint, spaced according to the speed;

rendering a plurality of predicted interval markers in the predicted sonic boom footprint, spaced according to the speed;

compile a set of related lateral movements, altitudes, and speeds that resolve the violation; and display the set of related lateral movements, altitudes, and speeds on the vertical situational display, wherein:

each computed interval marker is rendered to provide a visual indication if the computed interval marked corresponds to a resolvable violation or an unresolvable violation; and each predicted interval marker is rendered to provide a visual indication if the predicted interval marked corresponds to a resolvable violation or an unresolvable violation.

7. The method of claim 6, further comprising:

receiving an input corresponding to an adjustment to at least one of a prospective altitude or speed of the aircraft; and recomputing the predicted sonic boom footprint.

8. The method of claim 6, further comprising:

receiving an input corresponding to one of the set of related altitudes and speeds; and sending the related altitude and speed to an avionics system.

9. The method of claim 6, further comprising:
receiving an input corresponding to a waypoint in the vertical situational display;
entering an edit mode;
recalculating the predicted sonic boom footprint after every modification to a waypoint in the vertical situational display;
receiving an input corresponding to an affirmation of all modifications;
sending the modifications to an avionics system; and
exiting the edit mode.

* * * * *